J. O. NEIKIRK.
DUMP CAR.
APPLICATION FILED OCT. 21, 1909.

956,819.

Patented May 3, 1910.
8 SHEETS—SHEET 8.

UNITED STATES PATENT OFFICE.

JOHN O. NEIKIRK, OF MORGAN PARK, ILLINOIS, ASSIGNOR TO NATIONAL DUMP CAR COMPANY, OF CHICAGO, ILLINOIS, A CORPORATION OF MAINE.

DUMP-CAR.

956,819.  Specification of Letters Patent.  Patented May 3, 1910.

Application filed October 21, 1909. Serial No. 523,849.

*To all whom it may concern:*

Be it known that I, JOHN O. NEIKIRK, a citizen of the United States, residing at Morgan Park, in the county of Cook and State of Illinois, have invented certain new and useful Improvements in Dump-Cars, of which the following is a specification.

My invention relates to that class of cars known as dump cars in which there are central discharge openings and downwardly swinging doors which are adapted to close said openings or to open and release the load.

The object of my invention is to provide efficient dump door operating mechanism adapted more particularly for use in connection with cars of the type described and claimed in patent application Serial No. 510,878, filed by Frederick Seaberg and myself as joint inventors on August 2, 1909. The object and advantages of cars of that type are fully set forth in the joint application referred to and therefore need not be set forth at length herein. Briefly stated, according to the invention described in the pending joint application referred to a hopper car may be constructed with an unobstructed discharge opening and of great width, thus giving to the side and ends of the car sufficient slope to cause the lading to discharge freely and without assistance, and the construction is such that horizontal hopper doors may be located at a low level thus increasing the capacity of the car.

Other objects and advantages of my improvements will be made apparent in the following specification and claims, taken in connection with the accompanying drawings, in which—

Figure 1:
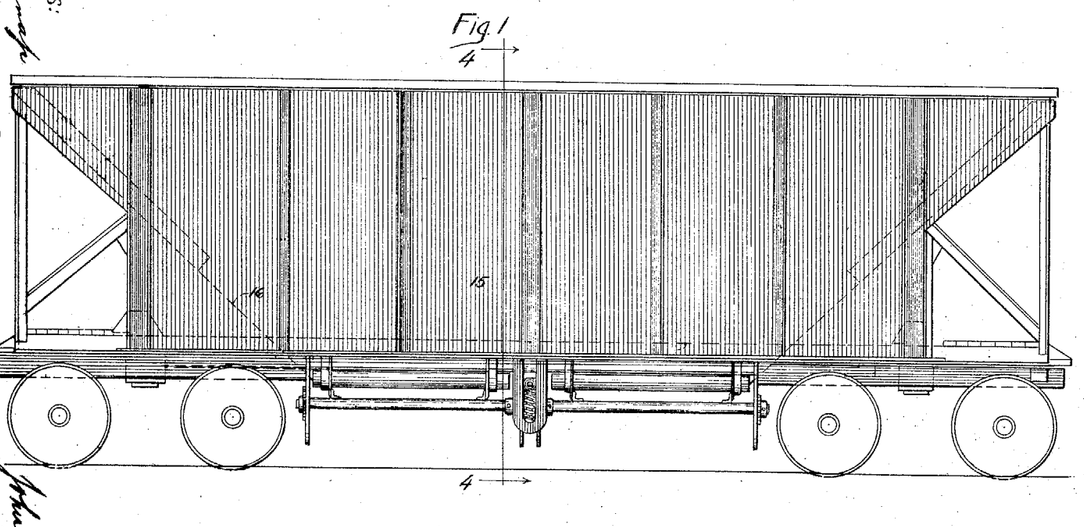
Figure 1 is a side elevation of a car with my improvements attached.
Figure 2:
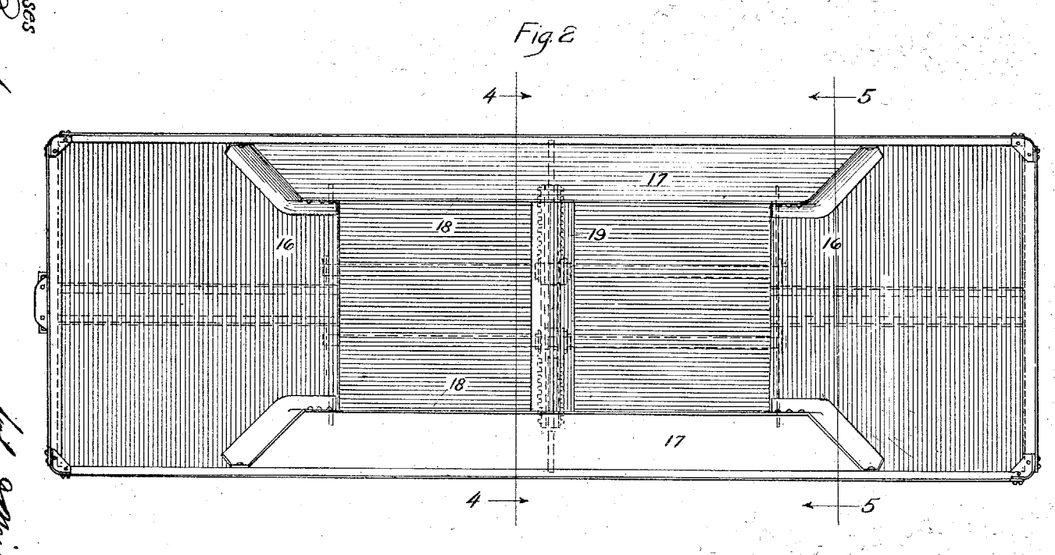
Fig. 2 is a plan view of the same.
Figure 3:
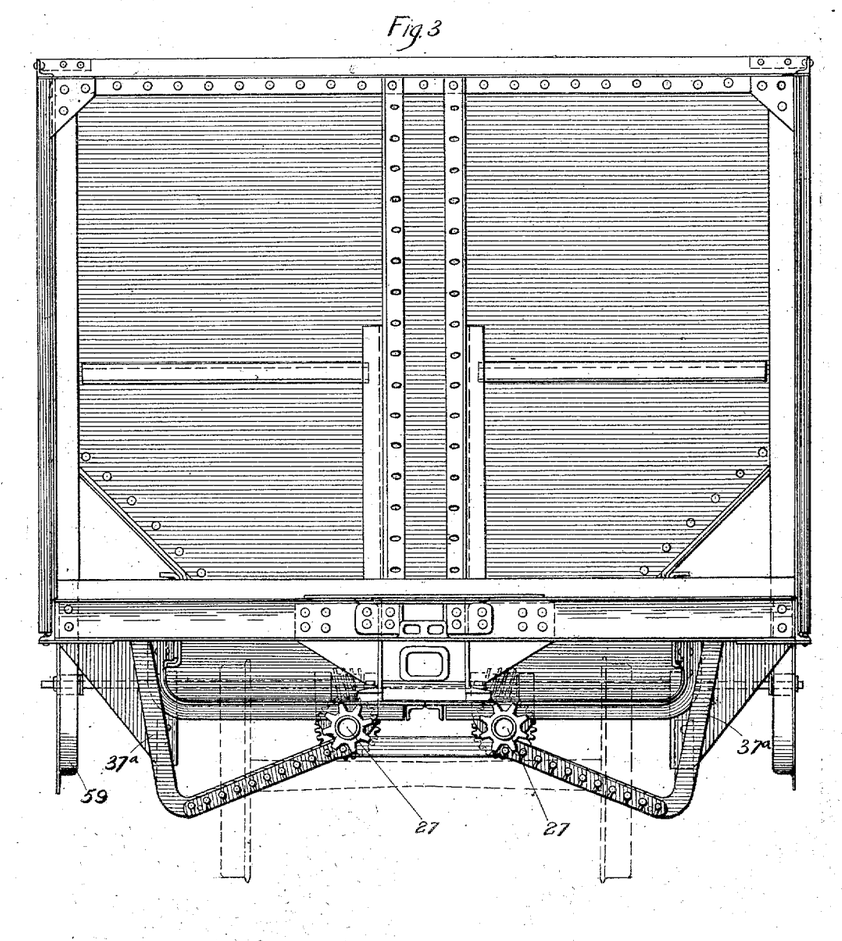
Fig. 3 is an end view.
Figure 4:
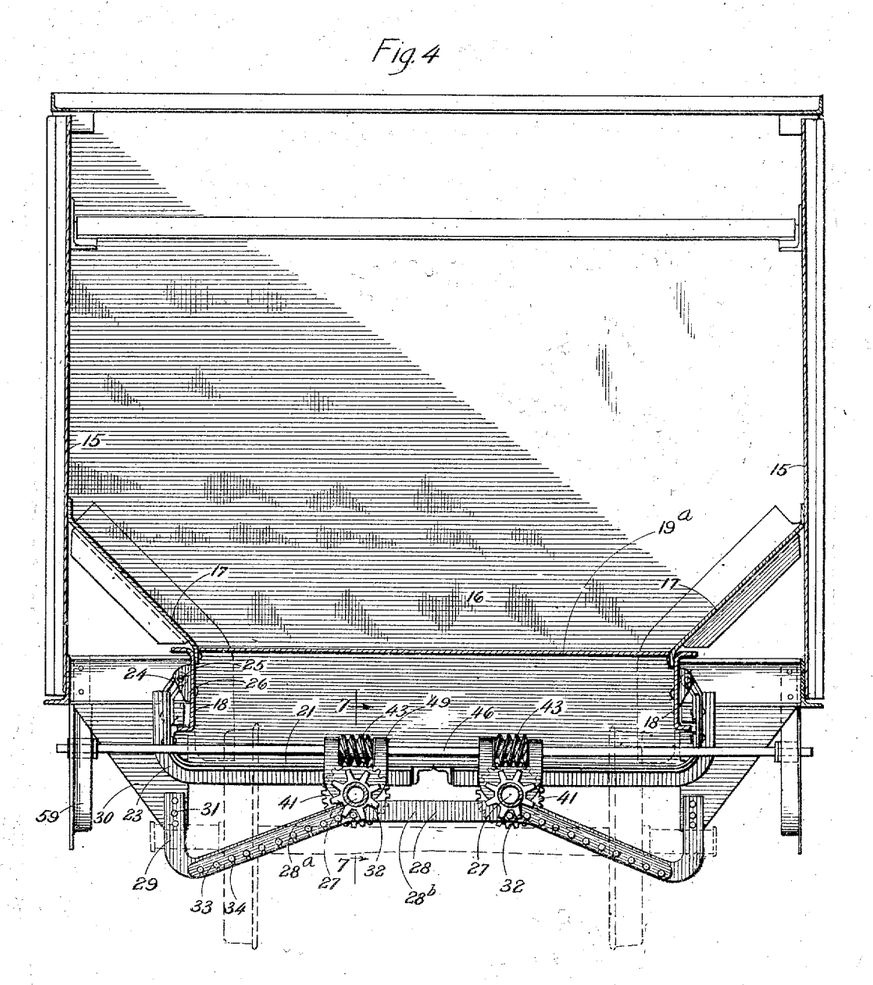
Fig. 4 is a cross section on the line 4, 4 of Figs. 1 and 2.
Figure 5:
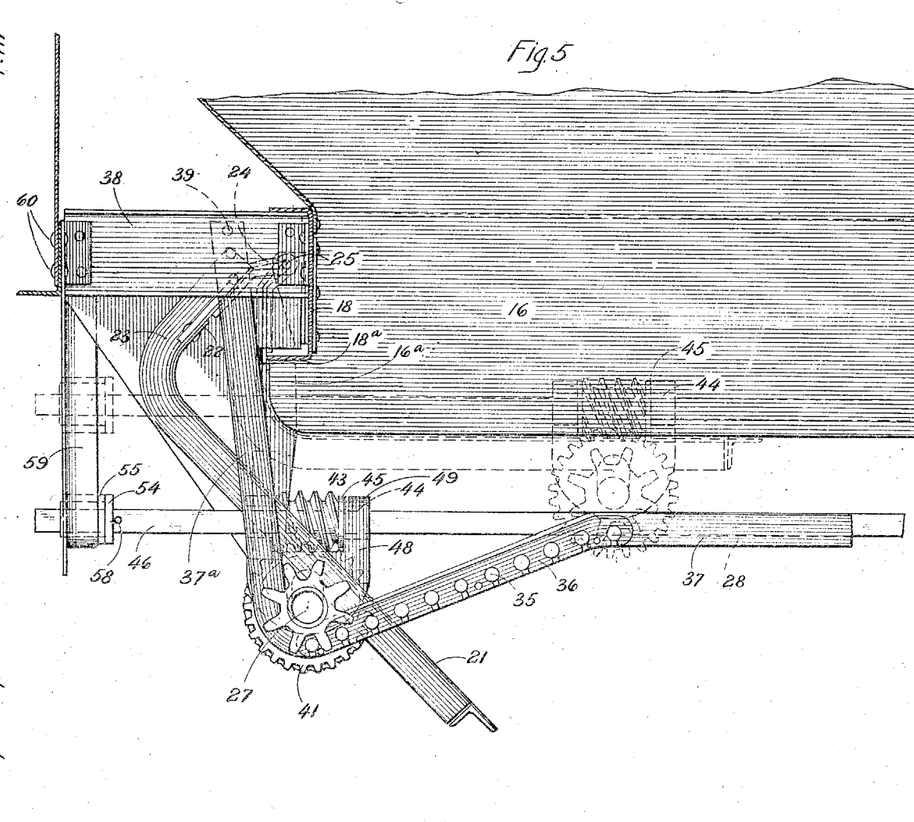
Fig. 5 is an end elevation on a larger scale than the above figures, of the lower part of the car at one side showing particularly the mechanism which operates one of the dump doors.
Figure 6:
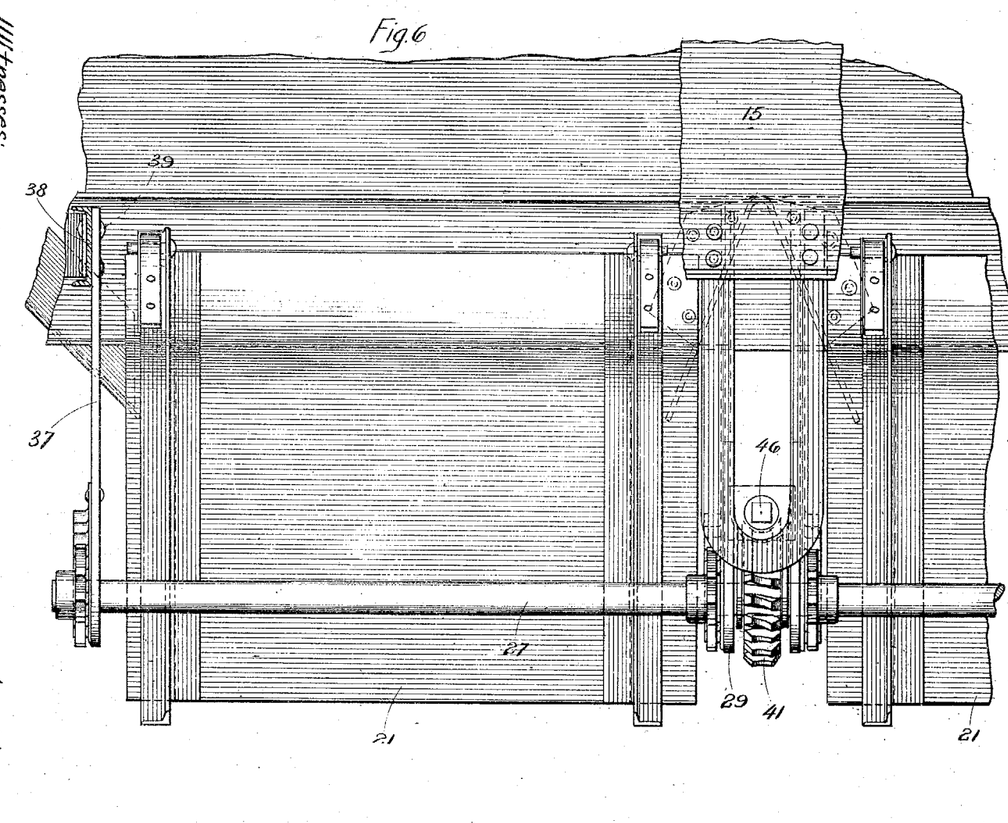
Fig. 6 is a side elevation of the lower part of the car at the center showing particularly the mechanism which operates the dump doors.
Figure 7:
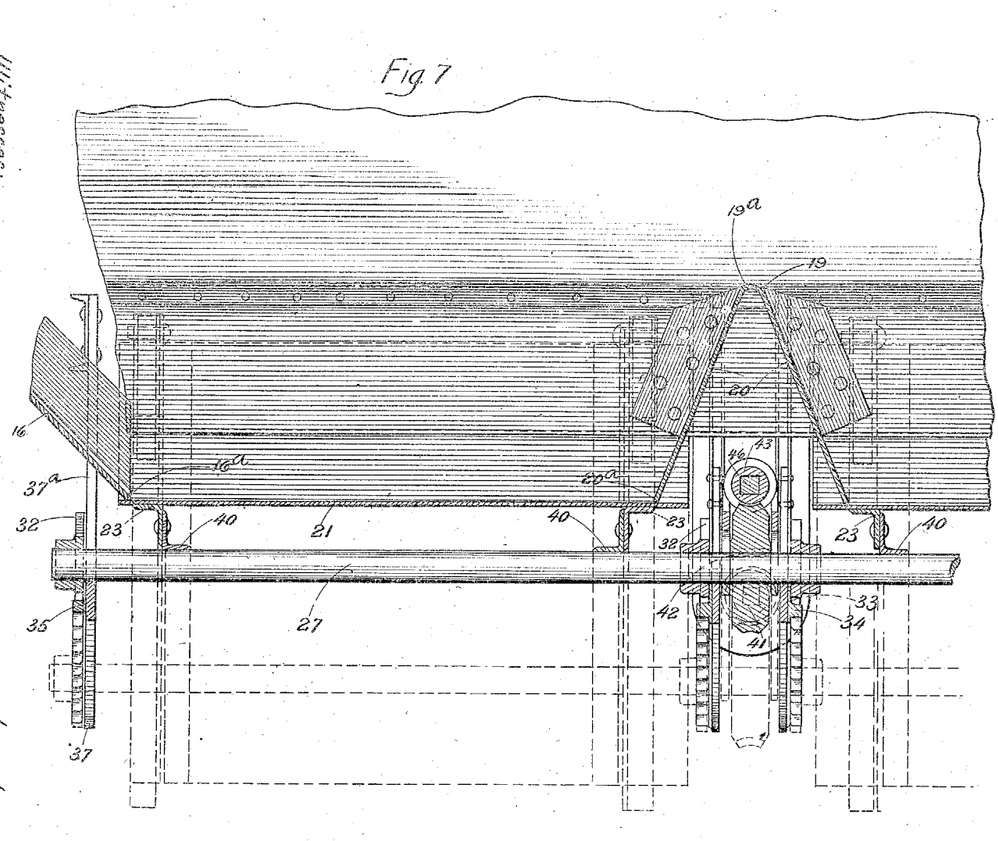
Fig. 7 is a longitudinal vertical section of the lower part of the car at or near the center along the axis of one of the door supporting and operating shafts and through the worm gearing.
Figure 8:
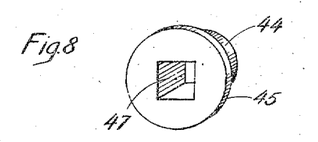
Fig. 8 is a perspective view of one of the bushings in the movable bearing block at the ends of the worm and inclosing the transverse shaft.
Figure 9:
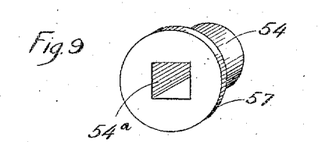
Fig. 9 is a similar bushing inclosing the transverse shaft at the ends and having a bearing in the vertical guide blocks.
Figure 10:
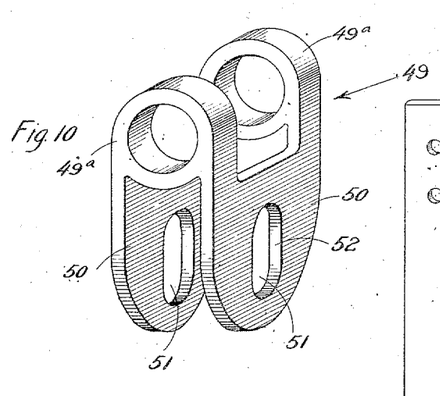
Fig. 10 is a perspective view of one of the movable bearing blocks, its chief function being to hold the worm gearing in mesh.
Figure 11:
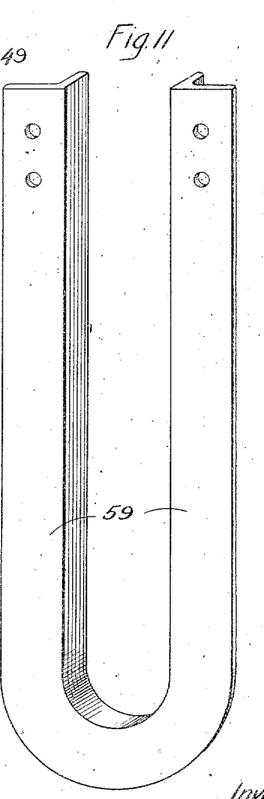
Fig. 11 is a perspective view of the guideway for the outer ends of the transverse shaft.
Figure 12:
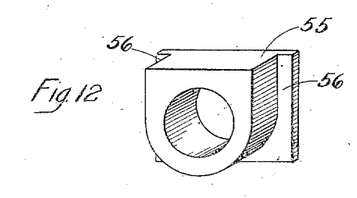
Fig. 12 is a perspective view of one of the slide blocks in which the outer ends of the transverse shaft have their bearing.

In the drawings the body of the car is composed principally of the side walls 15, the sloping end floor plates 16 and the sloping side floor plates 17. At their lower edges the sloping plates 17 are continued downward vertically, the vertical parts in the present instance taking the form of channels 18. The end floor plates 16, the side floor plates 17 and channels 18 unite to form a rectangular discharge opening at the center of the car. The sloping side and floor plates 17 are joined to the vertical walls 18 of longitudinal frame members of the car. These frame members taken in connection with the sloping floor plates 17 and the lower portions of the side wall 15 form a longitudinal column of great strength and serve to form the principal part of the structure of the car body.

The rectangular central discharge opening or chute above referred to is divided into two parts by a transverse frame member 19 formed of a steel plate which has sloping side walls 20 converging to a narrow ridge at their upper extremities 19ª. The lower edges 20ª of the sloping side portions 20 are made to extend downwardly to the same level with the lower edges of the sloping end floor plates 16.

The above described construction will be seen to provide two rectangular discharge openings at the center of the car which are substantially square in form. These discharge openings are closed by downwardly swinging dump doors 21 which are hinged adjacent the outer edges of said discharge openings. There are two doors 21 provided for each of the discharge openings making a total of four doors per car. The dump doors 21 meet along the longitudinal center line of the car and their opposite outer edges 22 are turned upwardly preferably at right angles to the body of the doors.

The doors 21 are strengthened and stiffened by the angle bars 23 which are fixed to them at the under side. These angle bars are bent upwardly at their outer ends to conform to the curvature of the bend adjacent the edges 22 and are extended a considerable distance beyond said edges. The hinge straps 24 are attached to the angle bars 23 and edges 22 by suitable rivets. These hinge straps 24 are pivoted upon the pins 25 and the said pins are supported by suitable hinge members 26 fixed to the vertical walls 18 of the car frame.

The dump doors 21 are supported and operated by movable supporting and operating shafts 27. These shafts 27 are in turn supported by the guiding and supporting bars 28 which are illustrated extending from side to side of the car body. The guiding and supporting bars or tracks 28 may of course consist of separate members at each side of the car instead of extending continuously across the car as illustrated. They are provided with upwardly turned ends 29 which are fixed to supporting plates 30 which extend downwardly from the frame of the car. Suitable rivets 31 may be used to fix the said bars to the plates 30. The guiding and supporting bars 28 are formed with upwardly and inwardly sloping portions 28ª which terminate in a horizontal portion 28ᵇ at the center of the car. It will be obvious, of course, that the guiding and supporting bars or tracks 28 might be arranged horizontally and the doors provided with inclines sloping downwardly and outwardly, or the tracks 28 might be inclined and inclines also provided on the doors as shown in Patent 826,874 granted to Spencer Otis July 24 1906.

The supporting and operating shafts 27 are provided with pinions 32 at their ends and also at the middle of their lengths. These pinions mesh with teeth 34 of racks 33 which are fixed to the guiding and supporting bars 28.

The guiding and supporting bars above described are those which are placed at the middle of the lengths of the supporting and operating shafts 27. At the ends of the shaft 27 a substantially similar construction is provided. The racks 35 at this point are fixed to guiding and supporting bars 37 which have the same form in their body portions, but are provided with slightly different end portions. These end portions 37ª are longer than the end portions 29 of the previously described guide bars and extend upwardly to the stays 38 in the car structure. Suitable rivets 39 join the ends 37ª to the stays 38.

The supporting and operating shafts 27 bear directly upon the angle bars 40 which are riveted to the previously described angle bars 23 on the under side of the doors 21. The flange of said angle bar 40 presents a larger wearing surface for the said shaft 27 to act upon.

At the middle of the length of the supporting and operating shaft 27 is fixed a worm wheel 41 by means of the key 42. The worm 43 is placed directly above the wheel 41 and meshes therewith. This worm 43 is slidably but non-rotatively engaged with a shaft 46. The shaft 46 is preferably square in form and fits the square opening in the worm 43. By this means the non-rotative engagement is effected.

The shaft 46 is arranged transversely of the car and of the supporting and operating shafts 27 and directly above the said shafts 27 as above described. The sleeves 44, having square apertures, are placed upon the shaft 46 and these sleeves have a cylindrical bearing in a movable bearing block 49. The purpose of this bearing block is to hold the worm wheel 41 and the worm 43 in mesh and to cause the worm to travel longitudinally upon the square shaft 46. This movement of the worm 43 along the shaft 46 is necessary in order to maintain the proper engagement of the worm and worm wheel while the supporting and operating shaft 27 is traveling along the upwardly inclined portion 28ª of the guiding and supporting bar 28.

The sleeves 44 are placed within the upwardly projecting loops or eyes 49ª of the block 49 and are retained therein by the flange 45. The worm 43 has an end bearing against the sleeve 44. The movable blocks 49 have downwardly projecting wings 50 which are provided with slots 51 through which is placed the supporting and operating shaft 27. The supporting and operating shaft 27 bears against the side walls 52 in the slot 51 and by this means is enabled to cause the block 49 to travel with it throughout its door operating movement.

The shaft 46 which we may call a power shaft extends from side to side of the car and is guided at its ends by the vertical guide bar 59 which is bent to a U-form and depends from the side walls 15 of the car body. It is fixed to the side walls 15 by suitable rivets 60. Each end of the shaft 46 is inserted in a sleeve 54 which has a square opening 54ª to receive it. Each of these sleeves 54 has a cylindrical bearing in a slide block 55 which is guided by the vertical guide bar 59. Flanges 56 on the slide block 55 prevent said slide block from sliding outwardly over the end of the shaft. The sleeve 54 is provided with a flange 57 which prevents a similar outward movement of said sleeve. A pin 58 through the shaft 46 prevents the inward sliding of said parts.

The outer ends of the shaft 46 are adapted to receive the hub of an operating crank or other suitable device for applying power to said shaft.

It will be observed that the central discharge openings have a vertical extension at each of their lateral edges which is due to the fact that the lower flange 18ª of the frame member 18 has a position some distance above the level of the doors 21. This vertical extension of the discharge opening is closed by the upwardly turned edge 22 of the door 21. It will also be seen that this vertical extension of the discharge opening projects laterally some distance beyond the walls 18 of the frame. The sloping end floor plates 16 are provided with outwardly projecting portions 16ª which fill the said discharge openings at the ends as far as the upwardly turned edges 22 of the doors 21. The transverse frame member 19 is also provided with similar outwardly projecting portions at its two lower edges which fill the discharge openings at the sides as far as the upwardly turned edges 22.

The operation of my improvements herein described is substantially as follows: The operator places a hand crank or other suitable device on either of the outer ends of the power shaft 46. By rotating this shaft the worm 43 is caused to rotate and to drive the worm wheel 41. The worm wheel 41 being fixed to the supporting and operating shaft 27, said shaft is rotated and by means of the pinions 32 and the teeth 34 of the racks 33 the said shaft 27 is caused to move upwardly and inwardly along the inclined portion of the guiding and supporting doors 28. The above described operation takes place when the operator rotates the power shaft 46 in such direction as to close the doors. The shaft 27 bears upon the side walls 52 of the slots 51 in the bearing blocks 49 and pushes the said bearing blocks along the shaft 46. The worm 43 being confined between the upwardly projecting bearings 49ª is obviously caused to travel with said bearing block and to be held in mesh with the worm wheel 51 throughout the whole extent of the movement of the shafts 27. The above described movement continues until the supporting and operating shafts 27 have reached the horizontal portion 28ᵇ of the guiding and supporting bars 28 at which time the doors 21 will have been moved to their closed position beneath the central discharge openings. The doors 21 are clearly held in constant contact with the shaft 27 by gravity and their movements are controlled by the said shaft 27. After the shafts 27 have reached the horizontal portion 28ᵇ of the guide bars 28 there is no tendency to slide downwardly and the doors are thereby securely held in their closed position.

A reverse rotation of the shaft 46 will cause the worm wheel 41 and hence the shafts 27 to move in the opposite direction until the said shafts 27 reach the inclined portion of the bars, after which gravity assists in the downward movement. During the movement of the shafts 27 along the inclined portion 28ª of the guide bars 28 the power shaft 46 has a vertical movement. The U-shaped guide bar 59 steadies the shaft 46 in its vertical movement.

The doors 21, being hinged at a point a considerable distance above the level of their bodies, will have an outward or lateral movement as well as a downward movement and these combined outward and downward movements produce a large opening for the discharge of the material in the car with a small angular movement of said doors. This permits the disposal of the discharge openings at a very low level and hence provides a large increase in the capacity of the car over that heretofore attained.

While I have described more or less precisely the details of construction, I do not wish to be understood as limiting myself thereto, as I contemplate changes in the form and proportion of parts and the substitution of equivalents as circumstances may suggest or render expedient without departing from the spirit of my invention.

I claim:—

1. In a dump car having central discharge openings, a plurality of hinged doors meeting at the center line of the car and having their outer edges turned at an angle to their bodies and hinged beyond said edges and above the plane of said bodies, movable supporting and operating shafts for said doors, tracks for said shafts supported by the frame of the car, and means for moving said shafts along the tracks.

2. In a dump car having central discharge openings, a plurality of hinged doors arranged in parallel rows longitudinally of the car and hinged adjacent the outer edges of the discharge openings, said doors having their outer edges turned upwardly and hinged above the plane of the bodies of the doors and their opposite edges meeting along the longitudinal center line of the discharge openings, movable supporting and operating shafts for said doors, guiding and supporting bars for said shafts adapted to cause the doors to close when the shafts are moved toward the center of the car, and means for effecting such movement of the shafts.

3. In a dump car having central discharge openings, and a series of dump doors hinged near the outer edges of said openings, supporting and operating shafts for said doors, tracks for said shafts supported by the car frame, and means for moving said shafts upon said tracks.

4. In a dump car having central discharge openings and dump doors hinged near the outer edges of said openings, supporting and operating shafts for said doors, tracks for said shafts sloping upwardly from their outer portions to a horizontal portion near the center of the car, racks on said sloping portions of said tracks, pinions on said shafts engaging said racks, and means for rotating said shafts.

5. In a dump car having central discharge openings, dump doors hinged near the outer edges of said openings, movable supporting and operating shafts for said doors, tracks for said shafts, racks on said tracks, pinions on said shafts engaging said racks, a worm gear on each of said shafts, a worm meshing with each of said gears, a power shaft arranged transversely of said supporting and operating shafts and on which said worms are slidably and nonrotatively mounted, and movable bearing blocks holding said worm gearing in mesh, said blocks being slidably mounted on said power shaft and adapted to travel with said supporting and operating shafts.

6. In a dump car having central discharge openings and dump doors hinged near the outer edges of said openings, movable supporting and operating shafts for said doors, tracks for said shafts, means by which said shafts are moved along said tracks when said shafts are rotated, a worm gear on each of said shafts, a worm meshing with each of said gears, a power shaft arranged transversely of said supporting and operating shafts on which said worms are slidably and nonrotatively mounted, and movable bearing blocks holding said worm gearing in mesh, said blocks being slidably mounted on said power shaft and adapted to travel with said supporting and operating shaft.

7. In a dump car having central discharge openings and dump doors hinged near the outer edges of said openings, movable supporting and operating shafts for said doors, tracks, means by which said shafts are moved along said tracks, when said shafts are rotated, a power shaft arranged transversely of said supporting and operating shafts, worm gearing connecting said shafts, and movable bearing blocks holding said worm gearing in mesh, said blocks being slidably mounted on said power shaft and adapted to travel with said supporting and operating shafts.

8. In a dump car having central discharge openings and dump doors hinged near the outer edges of said openings, movable supporting and operating shafts for said doors, guiding and supporting tracks for said shafts, a power shaft arranged transversely of said supporting and operating shafts, worm gearing connecting said shafts, and movable bearing blocks holding said worm gearing in mesh, said blocks being slidably mounted on said power shaft and adapted to travel with said supporting and operating shafts.

9. In a dump car having central discharge openings and dump doors hinged near the outer edges of said openings, movable supporting and operating shafts for said doors, guiding and supporting tracks for said shafts, a power shaft arranged transversely of said supporting and operating shafts, worm gearing connecting said shafts, and means for holding said worm gearing in mesh during the door operating movements of said supporting and operating shafts.

10. In a dump car having central discharge openings and dump doors hinged adjacent the outer edges of said openings, movable supporting and operating shafts for said doors, guiding and supporting tracks for said shafts, a power shaft arranged transversely of said supporting and operating shafts, and means operatively connecting said power shaft and said supporting and operating shafts.

11. In a dump car having a central discharge opening, a chute leading to said opening, a horizontal floor extending completely across said opening, said floor consisting of doors having their outer edges turned upwardly, said upturned edges forming prolongations of the side walls of said chute when said doors are closed.

12. In a dump car having a central discharge opening, a chute leading to said opening, a horizontal floor extending completely across said opening, said floor consisting of doors having their outer edges turned upwardly, said upturned edges forming prolongations of the side walls of said chute when said doors are closed, and hinges for said doors secured to the upturned edges thereof.

13. In a dump car having central discharge openings, dump doors hinged at the outer edges of said openings, door supporting and operating shafts for said doors lying parallel to the hinged edges of said doors, a power shaft arranged transversely of said shafts between the central discharge openings, means operatively connecting said power shaft and said supporting and operating shafts to rotate said shafts, and means by which said rotation causes said shafts to operate said doors.

14. In a dump car having central discharge openings, dump doors hinged at the outer edges of said openings, door supporting and operating shafts for said doors lying parallel to the hinged edges of said doors, a power shaft arranged transversely of said shafts between the central discharge openings, and means by which said power shaft operates said door supporting and operating shafts to close said doors.

15. In a dump car having central discharge openings, dump doors hinged at the outer edges of said openings, door supporting and operating shafts for said doors lying parallel to the hinged edges of said doors, a power shaft arranged transversely of said shafts between the central discharge openings, means by which said power shaft operates said door supporting and operating shafts to close said doors, and a frame member separating said discharge openings and protecting said transverse shaft and parts connected therewith.

16. In a dump car, dump doors arranged in separated groups, movable supporting and operating shafts for said doors, a power shaft arranged transversely of the first named shafts, between said groups, and means by which said power shaft is operatively connected to said supporting and operating shafts throughout their door operating movement.

17. In a dump car, dump doors, movable supporting and operating shafts for said doors, each of said shafts adapted to support and operate a plurality of doors, said doors being arranged in separated groups, a power shaft supported by said supporting and operating shafts, and means for operatively connecting said shafts to said power shaft throughout the travel of said shafts.

18. In a dump car, dump doors, movable supporting and operating shafts for said doors, each of said shafts adapted to support and operate a plurality of doors, said doors being arranged in separated groups, and means arranged between said groups for operating said shafts.

19. In a center dump hopper car horizontal hinged floor sections at the outlet of the hopper, displaceable supporting shafts for said hinged sections, said parts being so related as to transmit the load vertically through said shafts to the car frame when the hinged floor sections are closed.

20. In a center dump hopper car horizontal hinged floor sections at the outlet of the hopper, displaceable supporting shafts for said hinged sections, supporting tracks beneath said shafts, said parts being so formed that when said hinged floor sections are in closed position said shafts lie between parallel surfaces on said doors and tracks.

21. In a car, door operating mechanism comprising two rotatable and bodily movable shafts and gearing connecting said shafts.

22. In a car, a hinged dump door, a rotatable and bodily movable operating shaft engaging said door, and a rotatable and bodily movable power shaft extending transversely of said operating shaft and geared thereto.

23. In a center dump hopper car horizontal floor sections hinged at the longitudinal sides of the hopper outlet, displaceable longitudinal supporting shafts beneath said floor sections, supporting tracks for said shafts, and operating connections extending from said shafts to the side of the car, said shafts lying between parallel surfaces on said track and door when the latter is in closed position.

24. In a hopper car having a central discharge opening, a horizontal hinged drop bottom for said opening, a displaceable supporting shaft for said drop bottom, a supporting track beneath said shaft, said shaft transmitting the load vertically to said track when the doors are in closed position, and means for displacing said shaft, said means being adapted to follow the movement of said shaft.

25. In a dump car, a dump door, a reciprocable and rotatable supporting and operating shaft therefor, a reciprocable and rotatable power shaft extending transversely of said supporting and operating shaft, and means for communicating movements of reciprocation and rotation from one of said shafts to the other.

In testimony whereof, I have subscribed my name.

JOHN O. NEIKIRK.

Witnesses:
M. E. STOUTENBURGH,
G. F. McHUGH.